July 15, 1952
H. W. SNYDER
2,603,736
CARBON ARC-TORCH
Filed June 7, 1950
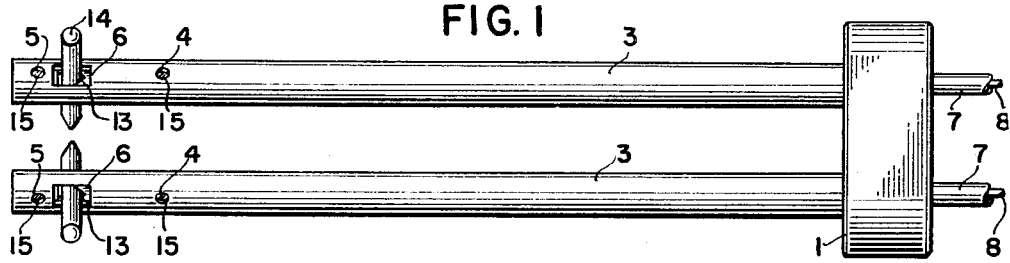
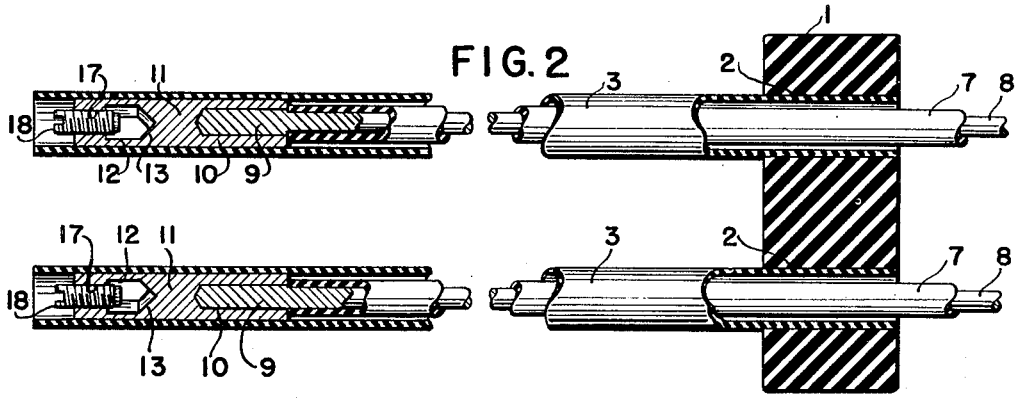
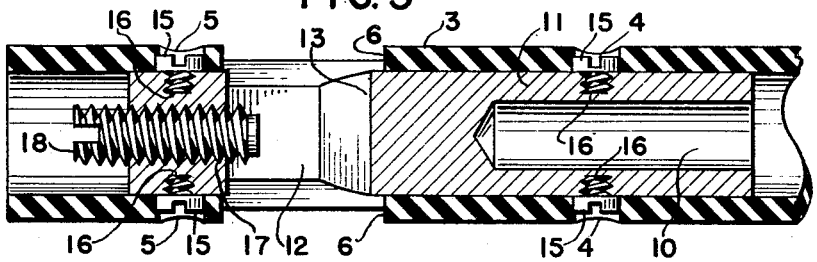
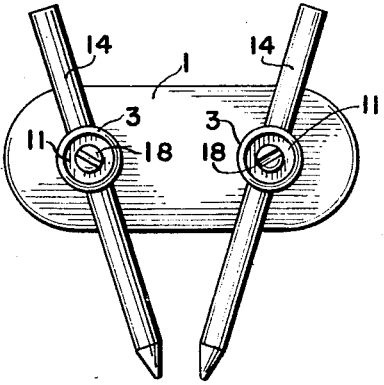
INVENTOR.
Henry William Snyder
BY *Lancaster, Allwine & Rommel*
ATTORNEYS.

Patented July 15, 1952

2,603,736

UNITED STATES PATENT OFFICE 2,603,736

CARBON ARC-TORCH

Henry William Snyder, Bozeman, Mont.

Application June 7, 1950, Serial No. 166,718

3 Claims. (Cl. 219—14)

This invention relates to electric welding torches, and more particularly to torches of the electric carbon type, wherein an arc is formed between the tips of a pair of spaced carbon electrodes mounted in a suitable holder, for soldering, brazing, welding, or like metal joining operations.

By way of background, it may be noted that one problem commonly encountered in the art is the provision of a torch of the type stated that will allow for the swift, easy, and positive ignition or extinction of the arc flame, as desired. Heretofore, adjustment of the electrodes toward or away from each other for the purpose of flame ignition or extinction, or for other regulation, has been proposed through the use of various devices all having as their object the mounting of the electrodes for relative movement.

However, attaining of these objects has resulted, quite generally, in the sacrificing of lightness, ready portability, and ease of operation. Further, the manufacture thereof has been complicated by the addition of parts usually required to provide for electrode adjustment in the manner stated.

In general, the main objects of the present invention are to provide a torch of the character described that will allow for flame ignition, extinction, or regulation positively and with maximum facility; that will at the same time be quite light in weight and easy to handle; cool in operation; and protectively enclosed from end to end thereof for safety in use.

Another important object is the provision of a carbon arc-torch novelty designed for the attainment of the previously stated objects while yet being capable of manufacture at relatively low cost, the torch being formed from a minimum of simple and durable parts having no movably interconnected portions that might tend to get out of order.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 1 is a top plan view of a carbon arc-torch formed in accordance with the invention.

Fig. 2 is an enlarged horizontal sectional view, portions being broken away and the electrodes being removed.

Fig. 3 is a longitudinal sectional view, still further enlarged, through the working end of one of the holders, the electrode being removed and the cable tip also being removed.

Fig. 4 is an end elevational view of the torch as seen from the left of Fig. 1.

Referring to the drawings in detail, I provide a transversely disposed holding member 1 preferably of solid formation and having the characteristic of rigidity, said block, in the example shown, being formed from such material as arc-resistant fabric-base plastic.

Formed in said member 1 are the spaced parallel cylindrical openings 2 in each of which is fixedly mounted, as by a force fit, one end of an electrode supporting tube 3, said tubes 3 being formed to any desired length and being open at both ends. The tubes 3, additionally, are of insulating plastic material having a natural characteristic of elasticity or resiliency, so that lateral pressure exerted thereagainst, adjacent the member 1, will cause a certain amount of flexing of the tubes to move the free ends thereof toward each other, after which relaxation of said pressure will permit the tubes to return to normal positions in which they are wholly parallel as in Fig. 1.

Spaced longitudinally of the respective tubes, and disposed near the free ends thereof, are the pairs of diametrically opposed smooth walled openings 4 and 5 respectively. In each tube I form, at a location between openings 4 and 5 thereof, a pair of larger electrode-receiving openings 6 and the provision of these pairs of openings as illustrated and described completes the formation of the tubes 3 per se.

Extending into the inner ends of the tubes are the highly flexible power cables leading from a source of electrical energy, not shown, each cable including the rubber insulating sheath 7 surrounding a conductive core 8 of copper or the like. A copper tip 9 of each cable is laid bare and is fixedly secured, as by soldering or other suitable means, within an end recess 10 formed in the inner end of the solid electrode holder 11. In the present instance, the electrode holders have sliding fits within the insulated tubes 3 and are fabricated, preferably from hard copper, although I believe brasses or bronzes of various compositions may effectively be utilized if electrical conductivity is approximately 80% or better. Lower conductivity material, understandably, will result in hotter operation of the part unless the cross sectional diameter thereof is correspondingly increased.

Adjacent the outer end of each electrode holder, there is an electrode-receiving opening 12 that extends completely through the holder, transversely thereof and at a slight angle from the vertical when the tubes 3 are horizontally disposed. These openings are oppositely inclined, as seen particularly from Fig. 2, and have pointed inner end surfaces 13 against which are held the carbon electrodes 14. By reason of the oppositely inclined arrangement of the openings 12, the electrodes 14, when mounted in said openings, will converge downwardly so as to define between their working tips a narrow space which, when properly reduced, provides the area over which the arc is struck.

As previously noted, the holders 11 are insertable slidably in the tubes 3. After being properly positioned within the bores of the tubes, they are secured against movement relative to the tubes by set screws 15 extending through and received and recessed in the openings 4 and 5, these being threaded in tapped recesses 16 of the electrode holders.

As a means for removably clamping the electrodes within the openings 12, tapped bores 17 are provided, these being a concentric bore formed in the outer ends of the holders 11 and extending into communication with the openings 12. A clamping screw 18 is mounted in each bore 17, and these screws, when turned home against the electrodes 14, force the electrodes into the pointed ends of the openings 12 and clamp them immovably in place.

As seen particularly from Fig. 3, the holders 11 are recessed within the tubes 3 so as to enclose protectively the heads of the clamping screws 18, so that these screws will not be accidentally struck against a piece of work or other object in a manner to relax their engagement with the electrodes, or bring about a short circuit.

In use, the torch is quite light, and is capable of being readily manipulated at almost all locations. In this connection, when the tubes 3 are disposed in full parallelism as illustrated, this being their normal position, the working tips of the electrodes will be spaced apart to an extent as will prevent the striking of an arc across the space therebetween. When, thereafter, an arc is to be struck for carrying out a metal joining operation, the user simply tightens his grip on the tubes 3, both of which are readily grasped in one hand. This brings the tips of the electrodes into closer proximity, since the tubes 3, though generally rigid, are adapted to be flexed toward each other at their free ends to a slight extent. This slight flexure of the outer end portions of the tubes 3 is nevertheless wholly sufficient to adjust the width of the arcing space in a manner to ignite or extinguish the flame instantaneously or, with equal swiftness, regulate the flame as to amount of heat produced thereby. All these adjustments, as will be understood, are effected responsive to tightening or loosening of the user's grasp upon the torch.

Of importance, it is believed, is the fact that the torch is of high efficiency in producing these desirable results while yet being devoid of levers, springs, geared connections, and other movably interconnected parts. In the invention, adjustably spaced tips are provided despite the fact that all parts of the torch are basically rigid and are rigidly interconnected, the invention making use advantageously of the inherent resiliency of a normally rigid tube when said tube is relatively elongated, rigidly anchored at one end, and free of hampering connections from its anchored to its free end.

It will be understood, of course, that to strike an arc, the user exerts lateral pressure on the tubes 3 to an extent as will first cause the working tips of the electrodes to touch to close a circuit therethrough, after which the pressure is relaxed to provide a space bridged by the arc, the circuit still being maintained. Complete relaxation of pressure breaks the circuit, but intermediate adjusted positions are within the control of the user for maintaining the arc while, to a degree, making it hotter or cooler for the particular operation being performed.

I claim:

1. An electrode holder for a carbon arc-torch or the like comprising, a pair of electrical conductor carrying tubes of resilient insulating material, means for rigidly securing an end of each of said tubes so that the tubes will extend therefrom in normally parallel relationship but subject to being flexed so that their outer ends may be brought toward or away from each other under control of the hand of the operator, current carrying conductors extending into said tubes from the secured ends thereof, an electrode holding means connected with the end of each conductor within the free ends of said tube, said tubes having apertures through opposite walls thereof adjacent to their free ends through which electrodes carried by the electrode holders may extend laterally from the tubes and angularly toward each other at one side of the tubes, said electrode holders including electrode holding clamps, and means for securing the electrode holding clamps in the tubes for positioning the electrodes in line with the apertures through the tube walls.

2. An electrode holder for a carbon arc-torch or the ilke comprising, a pair of electrical conductor carrying tubes of resilient insulating material, means for rigidly securing an end of each of said tubes so that the tubes will extend therefrom in normally parallel relationship but subject to being flexed so that their outer ends may be brought toward or away from each other under control of the hand of the operator, current carrying conductors extending into said tubes from the secured ends thereof, an electrode holding means connected with the end of each conductor within the free ends of said tube, said tubes having apertures through opposite walls thereof adjacent to their free ends through which electrodes carried by the electrode holders may extend laterally from the tubes and angularly toward each other at one side of the tubes, said electrode holders including electrode holding clamps, means for securing the electrode holding clamps in the tubes for positioning the electrodes in line with the apertures through the tube walls, and means within the ends of the tubes for operating said clamps for securing the electrodes in position.

3. An electrode holder for a carbon arc-torch or the like comprising, a pair of electrical conductor carrying tubes of resilient insulating material, a block of insulating material having a pair of parallel openings into which an end of each of said tubes is fitted so that the tubes will be rigidly supported thereby and extend therefrom in normally parallel relationship but subject to being flexed so that their outer ends may be brought toward or away from each other under control of the hand of the operator, current carrying conductors extending into said tubes from the block ends thereof, an electrode holding means connected with the end of each conductor within the free ends of said tube, said tubes having apertures through opposite walls thereof adjacent to their free ends through which electrodes carried by the electrode holders may extend laterally from the tubes and angularly toward each other at one side of the tubes, said electrode holders including electrode holding clamps, means for securing the electrode holding clamps in the tubes for positioning the electrodes in line with the apertures through the tube walls, and each of said electrode holding clamps having a longitudinally extending electrode clamping screw extending longitudinally through the electrode holding clamp and wholly within the end of the tube where it is accessible to be operated upon by a tool extending into the outer end of the tube.

HENRY WILLIAM SNYDER.

REFERENCES CITED

The following references are of record in the file of this patent:

UNITED STATES PATENTS

| Number | Name | Date |
|---|---|---|
| 1,352,541 | Von Schlegell | Sept. 14, 1920 |
| 1,618,080 | Gibbons | Feb. 15, 1927 |
| 1,708,003 | Weinman | Apr. 9, 1929 |
| 1,750,436 | Sounitza | Mar. 11, 1930 |
| 1,808,541 | Gillette et al. | June 2, 1931 |
| 1,834,991 | Alexander | Dec. 8, 1931 |
| 1,869,328 | Tobey | July 26, 1932 |
| 1,869,341 | May | July 26, 1932 |
| 1,910,668 | Bevard | May 23, 1933 |
| 1,946,306 | Catlett | Feb. 6, 1934 |
| 2,253,994 | Barclift | Aug. 26, 1941 |
| 2,266,239 | Nielsen | Dec. 16, 1941 |
| 2,274,157 | Nielsen | Feb. 24, 1942 |
| 2,291,199 | Anderson | July 28, 1942 |
| 2,299,679 | Casner | Oct. 20, 1942 |
| 2,300,203 | Campbell | Oct. 27, 1942 |
| 2,307,553 | Weller | Jan. 5, 1943 |
| 2,428,409 | Cushman | Oct. 7, 1947 |
| 2,438,279 | Forney | Mar. 23, 1948 |
| 2,438,701 | Huguley | Mar. 30, 1948 |
| 2,441,589 | Nichols | May 18, 1948 |
| 2,449,521 | Warner | Sept. 14, 1948 |
| 2,466,886 | Frade | Apr. 12, 1949 |
| 2,491,946 | Ballentine et al. | Dec. 20, 1949 |